(12) United States Patent
Bigi et al.

(10) Patent No.: US 6,402,238 B1
(45) Date of Patent: Jun. 11, 2002

(54) CAR SEAT WITH A HEAD REST

(75) Inventors: Dante Bigi, Torino (IT); Alexander Heilig, Wissgoldingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/446,041

(22) PCT Filed: Jun. 16, 1998

(86) PCT No.: PCT/EP98/03625

§ 371 (c)(1),
(2), (4) Date: Dec. 15, 1999

(87) PCT Pub. No.: WO98/57818

PCT Pub. Date: Dec. 23, 1998

(30) Foreign Application Priority Data

Jun. 16, 1997 (DE) ..................................... 297 10 511 U

(51) Int. Cl.⁷ .............................................. B60R 21/22
(52) U.S. Cl. ................................ 297/216.12; 280/730.1
(58) Field of Search ........................... 297/216.12, 391, 297/410; 280/730.1

(56) References Cited

U.S. PATENT DOCUMENTS

| | | |
|---|---|---|
| 3,420,572 A | 1/1969 | Bisland |
| 3,680,912 A | 8/1972 | Matsuura |
| 5,056,816 A | 10/1991 | Lütze et al. |
| 5,110,185 A | 5/1992 | Schmutz et al. |
| 5,378,043 A | 1/1995 | Viano et al. |
| 5,694,320 A * | 12/1997 | Breed ................. 297/216.12 X |
| 5,833,312 A * | 11/1998 | Lenz .................. 297/216.12 X |
| 6,158,812 A * | 12/2000 | Bonke ............... 297/216.12 X |
| 6,199,900 B1 * | 3/2001 | Zeigler .............. 297/216.12 X |

FOREIGN PATENT DOCUMENTS

| | | |
|---|---|---|
| DE | 3900495 | 7/1990 |
| DE | 29603991 | 8/1996 |
| EP | 0593845 | 4/1994 |
| EP | 0627340 | 12/1994 |

* cited by examiner

Primary Examiner—Peter R. Brown
(74) Attorney, Agent, or Firm—Tarolli, Sundheim, Covell, Tummino & Szabo L.L.P.

(57) ABSTRACT

A vehicle seat (10) with a back rest (12) and with an adjustable head rest (15) having a supporting surface (16) which the head of the vehicle occupant can touch in the case of restraint is characterized in that the head rest (16) has an expansion device which increases the size of the supporting surface (16) of the head rest (15) in the case of restraint. Furthermore, the head rest (15) is vertically adjusted in relation to the back rest (12) at least when the head rest (15) is arranged so close to the back rest (12) that the back rest (12) would prevent a complete increase in size of the supporting surface (16).

17 Claims, 4 Drawing Sheets

CAR SEAT WITH A HEAD REST

FIELD OF THE INVENTION

The invention relates to a vehicle seat with a head rest arranged on the back rest, having a supporting surface which the head of the vehicle occupant can touch for helping to protect the vehicle occupant.

BACKGROUND OF THE INVENTION

A conventional head rest, in the case of a rear impact, helps protect the head of a vehicle occupant. Usually, head rests are able to be inserted into the back rest, are vertically adjustable and are adjustable towards the head of the vehicle occupant. An optimal initial position of the head rest, adapted to the position of the head, is to have a minimal distance from the head to the head rest.

The conventional head rest moves closer to the head of the occupant to help protect the vehicle occupant. Nevertheless, with too low or too high an arrangement of the head rest, it is not possible to support the head of the occupant in an optimal manner.

SUMMARY OF THE INVENTION

It is an object of the invention to provide a vehicle seat with a head rest which supports the head of a vehicle occupant irrespective of whether the head rest is optimally adjusted. This object is achieved in a vehicle seat of the present invention in that the head rest has an expansion device which increases the size of the supporting surface of the head rest for helping to protect the vehicle occupant. In addition, the head rest is vertically adjusted in relation to the back rest at least when the head rest is arranged so close to the back rest that the back rest would prevent a complete increase in size of the supporting surface. In accordance with the present invention, the supporting surface of the head rest is increased in size by means of the expansion device, so that in every initial position of the head rest the head of the occupant is supported equally well. A vertical adjusting device has the effect that the increased supporting surface is actually fully available because it may otherwise happen that the back rest so obstructs the expansion process that the size of the supporting surface is increased incompletely or with a delay in time.

The head rest is preferably moved into a predefined basic position in which the supporting surface extends upwards from close to the back rest and offers an optimal protective effect for occupants of differing sizes, irrespective of the initial position of the head rest. In this position the back rest does not obstruct the enlargement process of the supporting surface. In addition, the head rest may be supported on the back rest and thereby move into the basic position itself by means of an increase in volume if the back rest prevents a complete increase in the size of the supporting surface with the head rest being set too close to the back rest.

The invention may be realized in two embodiments. According to the first embodiment, the supporting surface is achieved by inflating a gas bag. In the second embodiment, the expansion device is a mechanical device by means of which the supporting surface is increased, for example by the swivelling of levers or by moving apart individual padding elements of the head rest. In each of these embodiments, the head rest can, in addition, be actively moved closer to the head of the occupant for helping protect the vehicle occupant.

BRIEF DESCRIPTION OF THE DRAWINGS

In the following, the invention is described with reference to various embodiments illustrated in the attached drawings, in which:

FIGS 2a and 2b show a diagrammatic view of the back rest with head rest according to FIGS. 1a and 1b, the initial position of the head rest in the non-activated state being higher than in the position shown in FIG. 1a;

DETAILED DESCRIPTION OF EXAMPLES OF THE INVENTION

Figure 1A:
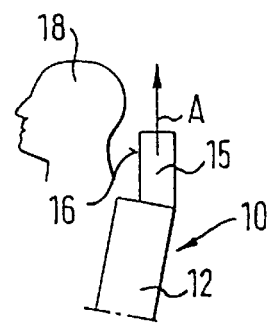
FIGS. 1a and 1b show a diagrammatic side view, partially in section, of a back rest of a vehicle seat with head rest in a non-activated in an activated state, respectively, according to a first embodiment.
Figure 1B:
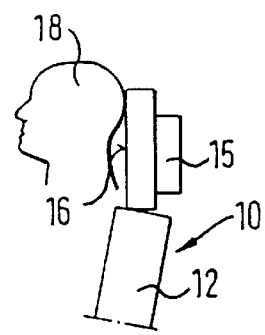

The vehicle seat 10, partially shown in FIGS. 1a and 1b, is provided with a conventionally constructed back rest 12, from which two bearing rods 14 of a bearing bracket upwardly project, on which bearing bracket a head rest 15 is pivotally mounted. The head rest 15 is vertically adjustable by means of the bearing arms 14 which are inserted into the back rest 12. FIG. 1a shows the position of the head rest 15 in an initial position and shows the head 18 of a vehicle occupant in an unprotected position before a frontal or a rear impact. In FIG. 1a the head rest 15 is brought into the lowest possible initial position thereby being inadequately adjusted vertically relative to the head 18 of the vehicle occupant.

According to the present invention, however, the supporting surface 16 of the head rest 15 is increased in size for helping to protect the vehicle occupant. Since the head rest 15 in FIG. 1a lies adjacent the upper end of the back rest 12, it is moved relative to the back rest due to the increase in size of its supporting surface 16, which supports the head 18 of the vehicle occupant. Otherwise, a complete increase in the size of the supporting surface 16 to the extent shown in FIG. 1b would be prevented by the back rest 12. By the increase in the size of the supporting surface 16, the head rest 15 is moved actively into a basic position in the direction of arrow A in FIG. 1a (i.e., vertically upward relative to the head 18 of the occupant). FIG. 1b shows the end position and basic position, of the head rest 15 after the supporting surface 16 has increased in size. In this basic position, the head rest 15 has moved upwards or, as is also possible, has been moved upwards by another device (not shown) In addition, the supporting surface 16 is now larger in size so that the head 18 of the occupant is supported optimally despite a non-optimal initial position of the head rest 15. By the horizontal distance to the head 18 also being distinctly reduced on activation of the head rest 15 (e.g. by moving the head rest towards the head or by its increase in volume) and by the supporting surface 16 being arranged closer to the head than in the initial position (FIG. 1a), the supporting surface thereby helps to protect the vehicle occupant.

Figure 2A:
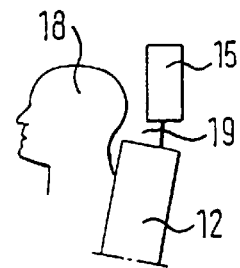
Figure 2B:
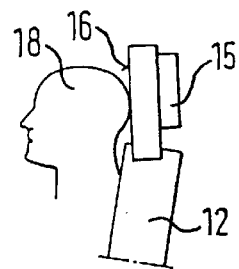

In FIG. 2a, another initial position is illustrated, in which the head rest 15 is actually set too high. In this case, too, the head rest 15 would not support the occupant's head 18 optimally. With the increase in size of the supporting surface 16 of the head rest 15, the intermediate space 19 between the upper end of the back rest 12 and the lower end of the head rest 15 is also filled, whereby the occupant's head is supported in an optimal manner.

The head rest 15 itself could, however, also be actively moved downwards in the direction of the back rest 12 into the basic position shown in FIG. 1b, for example, when the head rest is arranged so close to the inner surface of the vehicle roof that a complete increase in size of the supporting surface 16 would be prevented. Moreover, the head rest 15 can be movable forward in the direction of the head 18 of the occupant, i.e. horizontally. This further reduces the distance of the head 18 to the head rest 15. The movement of the supporting surface 16 closer to the head 18 of the occupant can be coupled with the increase in size of the supporting surface 16 of the head rest 15 by the volume of the head rest 15 being increased. The expansion of the head rest 15 proceeds not only upwards and downwards relative to the upper end of the back rest 12, but also forward toward the head 18 of the occupant. In this way, the distance between the head rest 15 and the head 18 of the occupant is reduced. Moreover, the increase in size of the supporting surface 16 of the head rest 15 can also be effected laterally, i.e. orthogonal to the plane of the drawing, in order to further increase the supporting region of the head rest 15 so that the head 18 is more optimally supported.

The forward movement of the head rest 15 can also be achieved by an additional device. This additional device can either operate independently of the enlargement of the head rest 15 or can be coupled therewith. In the latter instance, the head rest 15 is actuated by the increase in the size of the supporting surface 16. If, on the other hand, this device operates independently of the enlargement of the head rest 15, it is actuated to help protect the vehicle occupant independently of whether the expansion device is triggered. This additional device can also move the head rest 15 vertically if necessary, i.e. to or away from the back rest 12. Thereby, the head rest 15 is moved into the basic position in which the increasing of the supporting surface 16 is not presented with any obstacles. The additional device for the forward and/or vertical movement of the head rest 15 may be a conventional device.

Figure 3A:
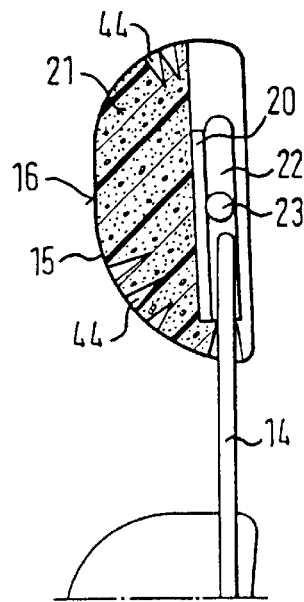
FIGS. 3a and 3b show a diagrammatic side view, partially in section, of a second embodiment of the head rest in a non-activated and in an activated state, respectively.
Figure 3B:
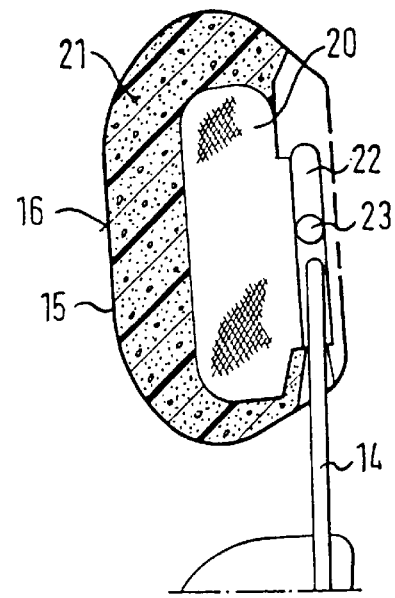
Figure 4A:
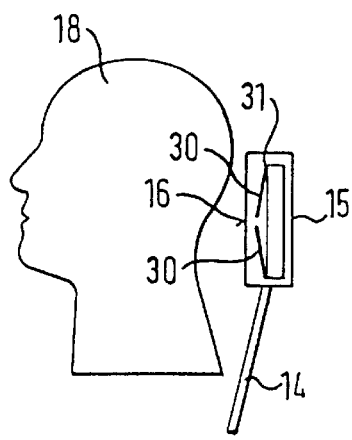
FIGS. 4a and 4b show a diagrammatic side view, partially in section, of a third embodiment of the head rest in the non-activated and activated state, respectively.
Figure 4B:
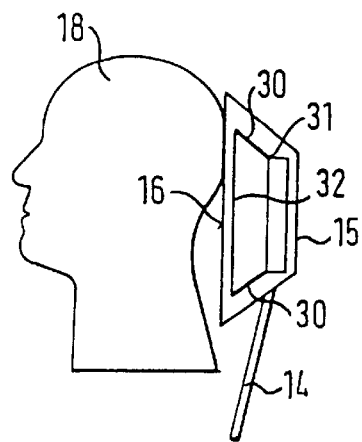

The expansion device can either be an inflatable gas bag or a mechanically actuated device. An expansion device with an inflatable gas bag is shown in FIGS. 3a and 3b. In this example, the inflatable gas bag 20 is situated inside the head rest 15 between a foamed padding 21 and the frame part 22 of the head rest 15. A gas generator 23 inflates the gas bag 20. The gas bag 20 and the gas generator 23 are surrounded by the padding 21 on all sides, except for the rear face of the head rest 15. The padding 21 is part of the covering of the head rest 15, which consists of padding 21 and also a cover. By this embedding of the gas generator 23 and of the gas bag 20 into the padding 21, the expansion occurring on igniting of the gas generator and unfolding of the gas bag is considerably muffled. When the expansion device is triggered, the gas bag 20 is inflated in the head rest 15. In this way, the supporting surface 16 of the head rest 15 increases and may move itself into the basic position, because it abuts against the back rest 12. The inflatable gas bag 20 may be shaped such that it unfolds principally upwards and downwards and that the head rest 15 increases upwards or downwards. On the other hand, it is possible to delimit the inflatable gas bag 20 spatially so that it only extends upwards and downwards. In this embodiment, the gas bag 20 is situated outside the actual head rest 15 with a gas bag module being arranged on the front part of the head rest and forming its front part.

In another embodiment, a chamber is provided inside the head rest 15 which is inflatable by the gas generator 23. The chamber is delimited by the covering of the head rest 15. The covering may consist of a material with a low gas permeability and may be elastic so that the gas bag 20 itself can be omitted. The elastic covering thus takes on the function of the gas bag and is inflated. In this embodiment, the covering consists of padding 21 and of a cover surrounding the padding with the padding and cover both having a low gas permeability.

In addition, the gas generator 23 may be arranged in the back rest 12. At least one of the bearing rods 14 is constructed so as to be internally hollow and thereby has a gas guide duct (not shown) through which generated gas is directed into the interior of the head rest 15.

In a further embodiment of the present invention, the expansion device may be constructed purely mechanically. Such mechanical expansion devices are shown in FIGS. 4a, 4b, 5a and 5b. The mechanical expansion device in FIGS. 4a and 4b consists of two levers 30 which are rotatably mounted at one of their ends 31. A flexible band 32 connects the free ends of the levers that are opposed to the rotatable ends. On swivelling of the two levers in opposite directions, the band 32 becomes taut and forms a supporting wall inside the head rest 15. By this swivelling apart of the levers 30, the supporting surface 16 of the head rest 15 is increased and is displaced nearer the head 18 of the occupant.

The swivelling movement of the levers 30 can be achieved by various drives, for example a spring drive or a pyrotechnic drive. The end position of the levers 30 after swivelling may be fixed, for example by a suitable ratchet mechanism.

Figure 5A:
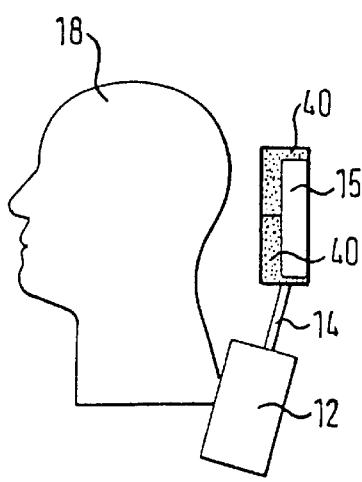
FIGS. 5a and 5b show a variant to the solution shown in FIGS. 4a and 4b, in the non-activated and activated state, respectively.
Figure 5B:
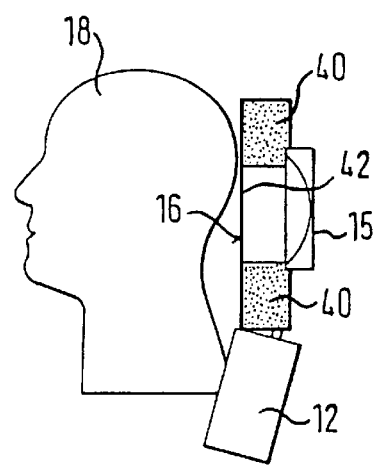

In FIGS. 5a and 5b, a further embodiment is shown. The head rest 15 has two padded support parts 40 which are moved vertically in opposite directions to help protect the vehicle occupant (cf. FIG. 5b) and in so doing tension a supporting wall 42, consisting of a fabric part, and increase the size of the supporting surface 16.

A covering surrounding the frame part of the head rest 15, i.e. the entire padding and/or the material cover which covers the padding, can be of an expansible material, such as stretch fabric. Furthermore, it is possible to provide the covering with at least one folded region with pockets (not shown) extending into the interior of the head rest 15. This folded region may be unfolded to increase the supporting surface 16 and serve to avoid a tearing out of the padding. The pockets can be closed towards the exterior by tear seams, so that a closed supporting surface 16 exists before activation of the expansion device. On activation of the expansion device, the tear seams are torn open by the expansion and the folded region unfolds.

In order to prevent the padding 21 from being destroyed on unfolding of the gas bag 20 or on inflating of the padding, the padding may have several incisions 44 by means of which the padding alters its shape in a defined manner with the increase in volume of the head rest 15, as is shown in FIG. 3b. The incisions 44 are provided in particular in the regions of the greatest stress on the padding 21, e.g. close to the supporting surface 16. Preferably the padding 21 completely surrounds the gas bag 20 in its unfolded state.

The position of the head 18 of the occupant may be scanned by suitable sensors for determining movement toward the head. In addition, when using a gas bag, its hardness can be adapted to the impact intensity of the vehicle, e.g. by the use of a multiple stage gas generator.

Figure 6:
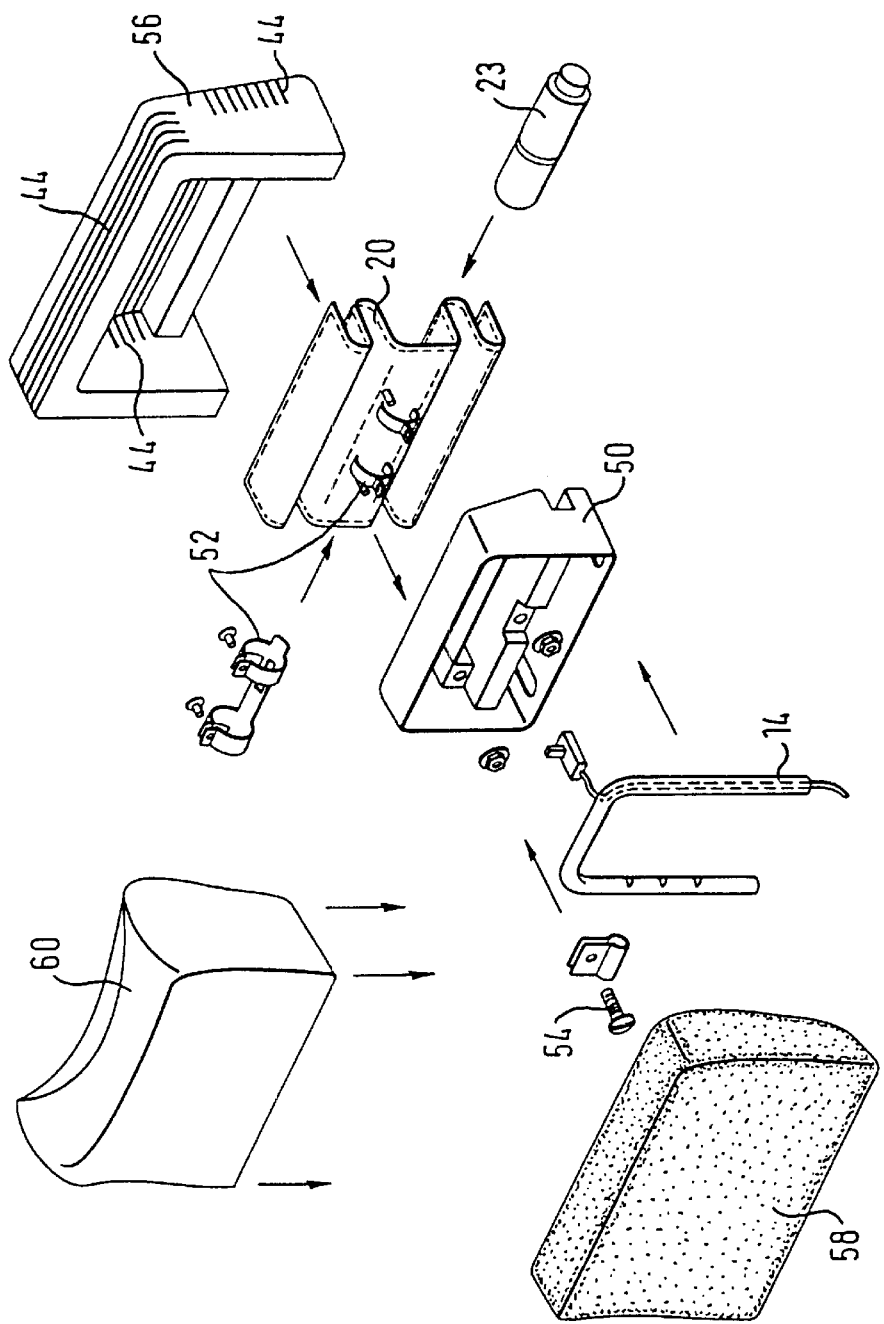
FIG. 6 shows an exploded view of a head rest as part of the vehicle seat according to the invention, in accordance with a further embodiment.

FIG. 6 shows a further embodiment, which is distinguished by a very simple installation capability of the head rest 15 and also a simple exchangeability of the gas generator 23. After activation of the head rest 15, only the gas generator 23 has to be exchanged and not the entire head rest. The head rest 15 comprises an interior body 50 of inherently stable material. A bearing bracket with bearing rods 14 is fastened on a rear face of the body 50. On a front face of the body 50, the gas bag 20 together with the gas generator 23 is fastened to the body 50. The fastening is carried out as follows: Firstly a clamp strap 52 is placed into the gas bag 20. The gas generator 23 is inserted laterally in the clamp strap 52, so that a gas bag module is assembled. This module is fastened to the body 50 by means of a screw and clamp connection 54. Then a front padding part 56, constructed as a shaped part, and a rear padding part 58 are put in position and a material cover 60 is put over the head rest 15, by which the padding parts 56 and 58 are pressed against each other. The front padding part 56 has numerous incisions 44 (as indicated in FIG. 3a), which are provided on the inner and outer sides of the front padding part 56 and lead to a defined change in shape. The head rest 15 is constructed such that the elasticity of the padding parts 56, 58 and the material cover 60 allows the head rest to reassume its initial shape after activation of the gas generator 23. After activation, only the gas generator 23 has to be exchanged to resume functionality of the head rest 15. The gas generator 23 can also be fastened to the gas bag module by a bayonet or screw type lock (not shown).

Figure 7:
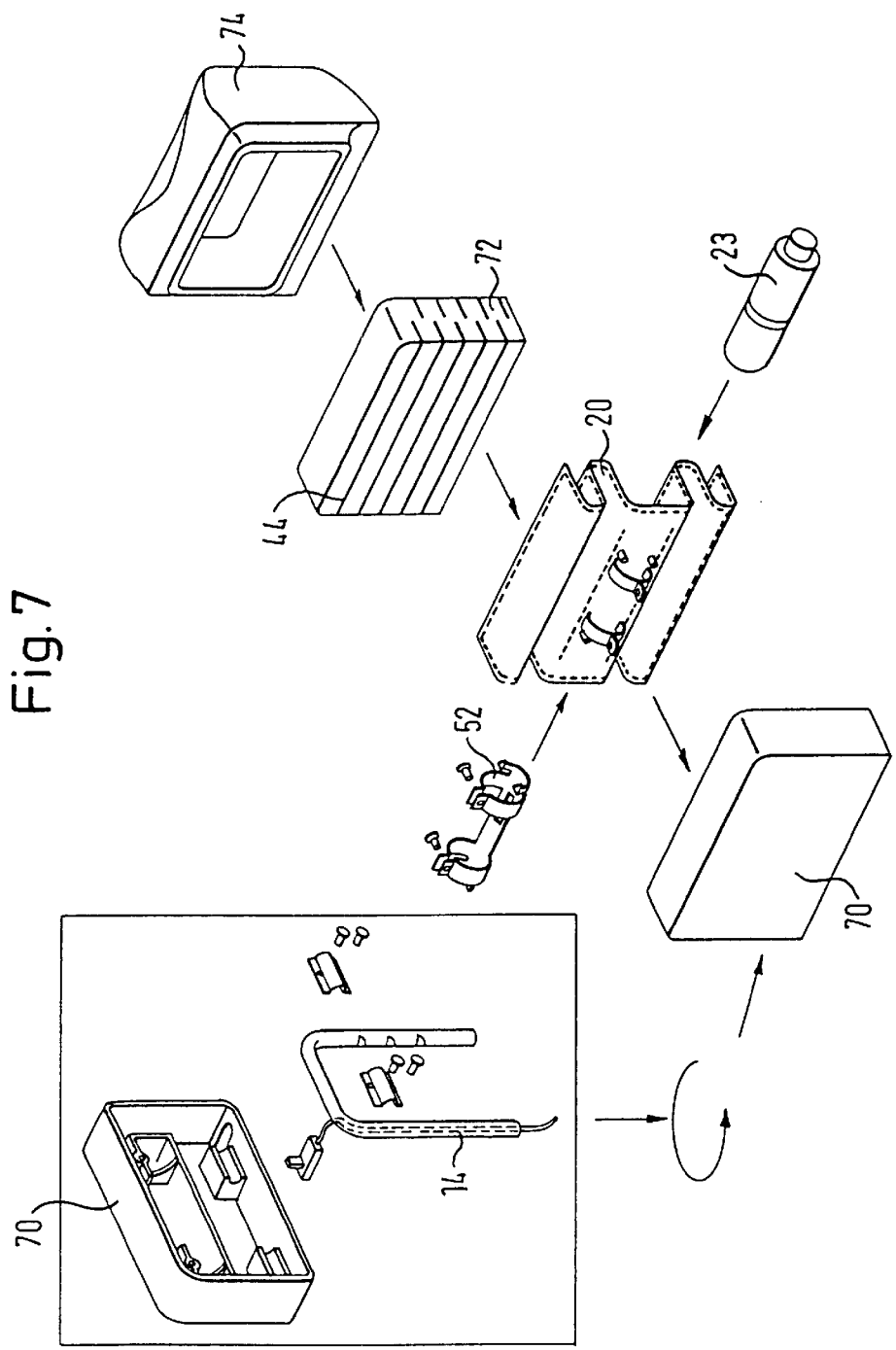
FIG. 7 shows an exploded view of a head rest as apart of the vehicle seat according to the invention, in accordance with yet a further embodiment.

The embodiment illustrated in FIG. 7 differs from the embodiment of FIG. 6 in that the body 50 and the rear padding part 58 are replaced by a housing 70 (shown from the front in the framed detail drawing in FIG. 7). A bearing bracket is fastened in the housing 70. The housing 70 also holds the gas bag module which is constructed similar to the gas bag module of FIG. 6. To the front of the gas bag module, a padding part 72 is provided which has numerous incisions 44. After the padding part 72 has been arranged in front of the gas bag module, a cover 74 of elastic synthetic material is put on and fastened to the housing 70 by means of clip connections. Again, after activation, only the gas generator 23 has to be exchanged to resume functionality of the head rest 15.

From the above description of the invention, those skilled in the art will perceive improvements, changes, and modifications. Such improvements, changes and modifications within the skill of the art are intended to be covered by the appended claims.

Having described the invention, we claim:

1. A vehicle seat comprising:
    a back rest; and
    an adjustable head rest, said head rest including a supporting surface for supporting a head of a vehicle occupant, said head rest further including a gas generator for increasing the surface area of said supporting surface,
    said head rest being adjusted upwards relative to said back rest for helping to protect the vehicle occupant, said head rest being expanded by fluid from said gas generator thereby causing said supporting surface of said head rest to push against said back rest and move said head rest upwards relative to said back rest when said head rest is near said back rest.

2. The vehicle seat according to claim 1, characterized in that the increase in size of the supporting surface occurs in vertical and horizontal directions.

3. The vehicle seat according to claim 1, characterized in that, to help protect the vehicle occupant, said head rest is moved into a predefined basic position in which said supporting surface extends upward from close to said back rest and is not obstructed by said back rest.

4. The vehicle seat according to claim 1, characterized in that said gas generator inflates an inflatable gas bag within said head rest.

5. The vehicle seat according to claim 4, characterized in that said gas bag, in an unfolded state, is disposed at least partially outside said head rest.

6. The vehicle seat according to claim 4, characterized in that said gas bag, in an unfolded state, is disposed completely within an interior of said head rest.

7. The vehicle seat according to claim 4, characterized in that said gas generator is arranged inside said head rest and is able to be exchanged separately from said head rest.

8. The vehicle seat according to claim 4, characterized in that said gas generator is arranged in said back rest, said vehicle seat further including a bearing rod fastening said back rest to said head rest, said bearing rod having a gas guide duct for directing gas into an interior portion of said head rest.

9. The vehicle seat according to claim 1, characterized in that said head rest has an expansible covering.

10. The vehicle seat according to claim 1, characterized in that said head rest has incisions permitting an increase in volume of said head rest without destroying said head rest.

11. The vehicle seat according to claim 1, characterized in that said gas generator and a gas bag are arranged in said head rest and are surrounded by said head rest.

12. The vehicle seat according to claim 1, characterized in that said head rest has a chamber in an interior portion of said head rest, said chamber being inflatable by said gas generator and delimited by said head rest, said head rest being formed from a material with a low gas permeability.

13. The vehicle seat according to claim 1, characterized in that said head rest has a padding part and a cover surrounding said padding part, said padding part and said cover consisting of a material with low gas permeability.

14. The vehicle seat according to claim 1, characterized in that an internal pressure of said head rest, produced by said gas generator, depends on the intensity of an impact to a vehicle.

15. The vehicle seat according to claim 1, characterized in that an additional device moves said head rest independently of said gas generator.

16. The vehicle seat according to claim 1, characterized in that said vehicle seat further includes a sensor for determining a position of the head of the vehicle occupant and that an amount of inflation of said head rest is dependent on a determined position of the head of the vehicle occupant.

17. The vehicle seat according to claim 1, characterized in that said head rest automatically reassumes an initial shape after expansion of said head rest has been completed.

* * * * *